(No Model.) 3 Sheets—Sheet 1.

M. & O. HELGESON.
COMBINED REEL CARRIER AND FEED CART.

No. 601,807. Patented Apr. 5, 1898.

Witnesses
F. H. Schott
R. A. Gretzner

Inventors
Martin Helgeson
Olaus Helgeson
by Max Engü
Attorney (No Model.) 3 Sheets—Sheet 2.

M. & O. HELGESON.
COMBINED REEL CARRIER AND FEED CART.

No. 601,807. Patented Apr. 5, 1898.

Witnesses
F. H. Schott
R. A. Gloetzner

Inventors
Martin Helgeson
Olaus Helgeson
by Mar Hungu
Attorney (No Model.)  M. & O. HELGESON.  3 Sheets—Sheet 3.
COMBINED REEL CARRIER AND FEED CART.
No. 601,807.  Patented Apr. 5, 1898.

Witnesses
F. H. Schott
R. A. Gloetzner

Inventors
Martin Helgeson
Olaus Helgeson
by M. A. Hingii
Attorney

UNITED STATES PATENT OFFICE.

MARTIN HELGESON AND OLAUS HELGESON, OF LINDEN, MINNESOTA, ASSIGNORS OF ONE-THIRD TO R. K. RASMUSSON, OF LAKE CRYSTAL, MINNESOTA.

COMBINED REEL-CARRIER AND FEED-CART.

SPECIFICATION forming part of Letters Patent No. 601,807, dated April 5, 1898.

Application filed June 12, 1897. Serial No. 640,491. (No model.)

*To all whom it may concern:*

Be it known that we, MARTIN HELGESON and OLAUS HELGESON, citizens of the United States, residing at Linden, in the county of Brown and State of Minnesota, have invented certain new and useful Improvements in a Combined Reel-Carrier and Feed-Cart; and we do hereby declare the following to be a full, clear, and exact description of the invention, such as will enable others skilled in the art to which it appertains to make and use the same.

Our invention relates to an improvement in combined feed-carts and reel-carriers.

The object of our invention is to provide a device which will be specially efficient as a reel-carrier in the erection and in the removal of wire fences or for similar purposes and which when not required as a reel-carrier may be arranged for use as a feed-cart and in that condition may be employed advantageously in transporting and distributing feed for cattle and the like.

Our invention consists in the features, details of construction, and combination of parts, which will first be described in connection with the drawings and then particularly pointed out in the claims.

Figure 1:
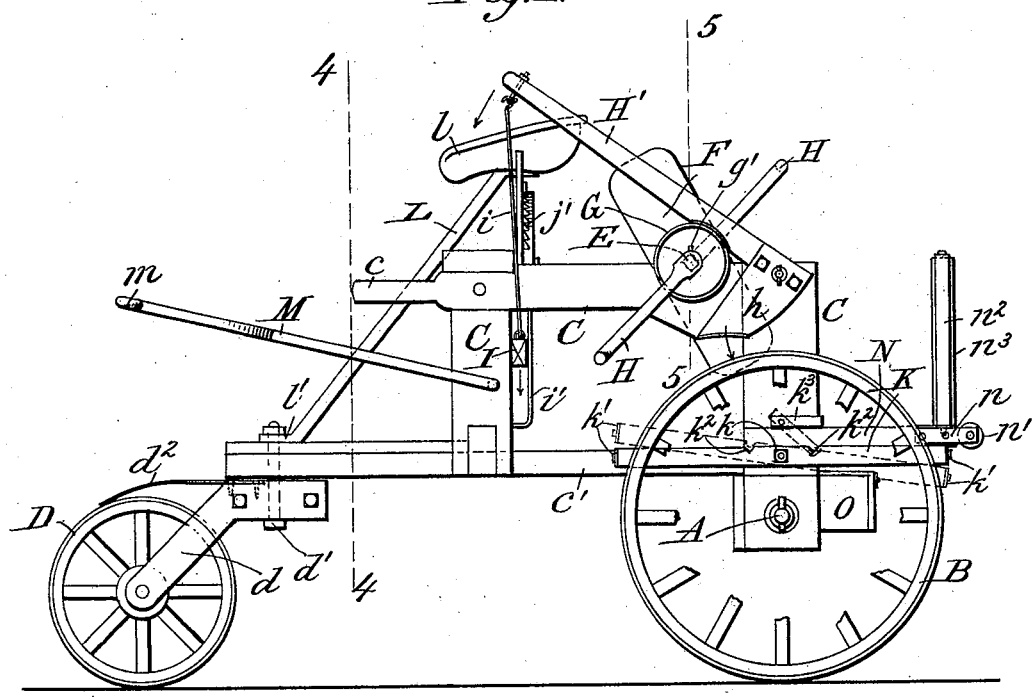
Figure 2:
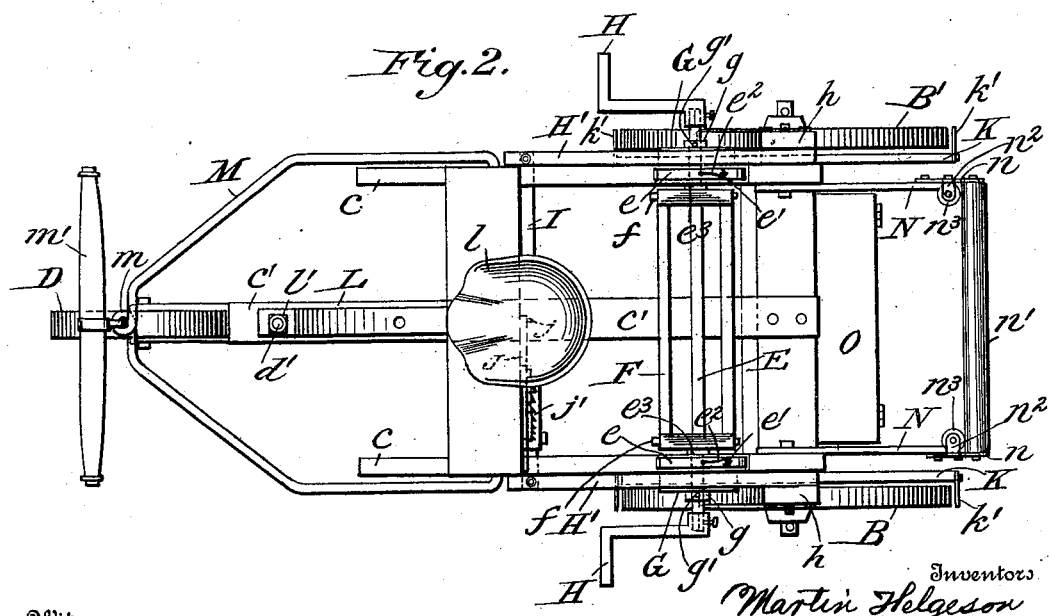
Figure 3:
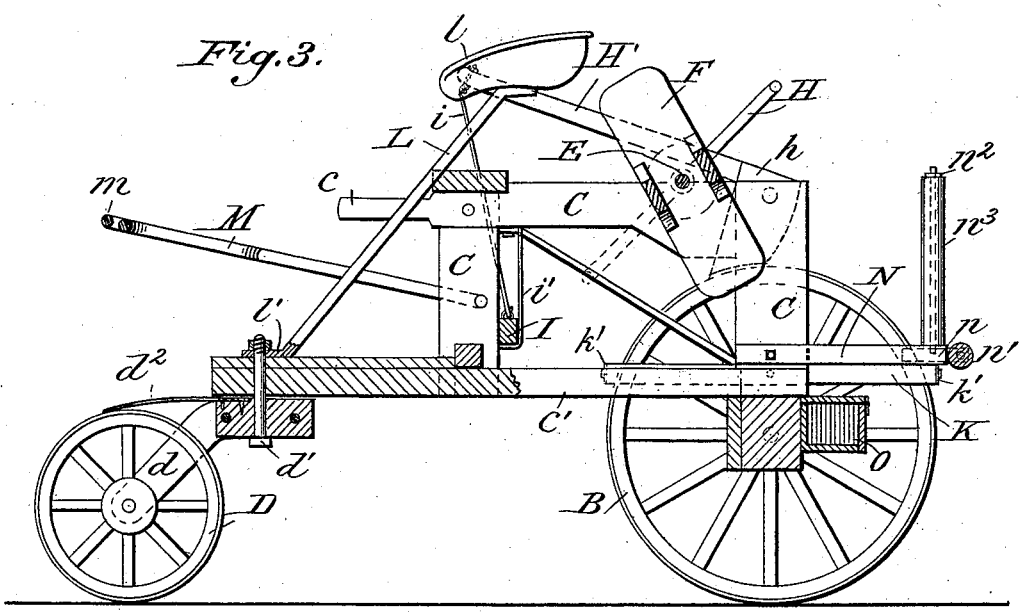
Figure 4:
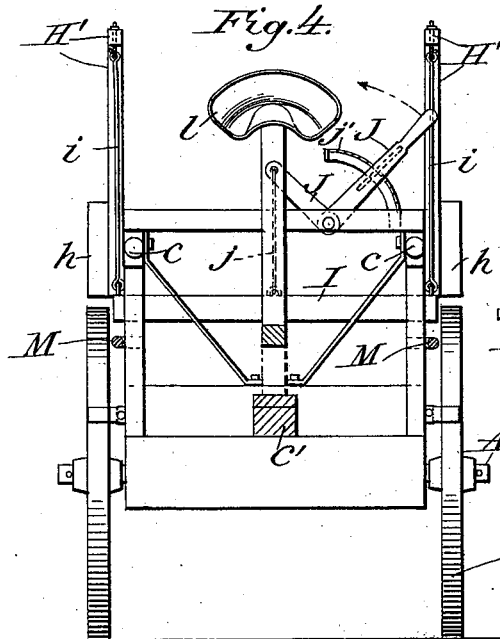
Figure 5:
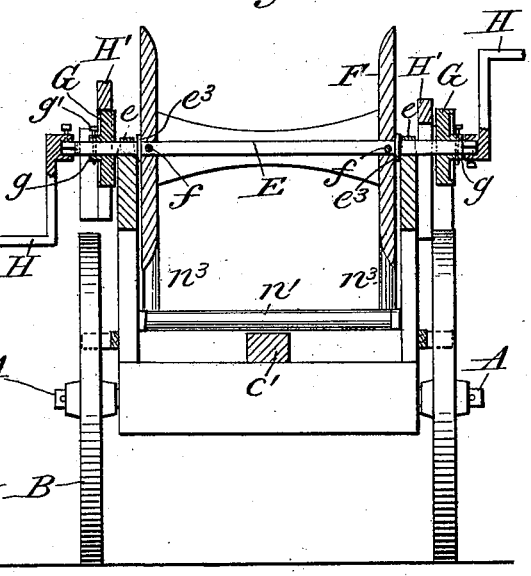
Figure 6:
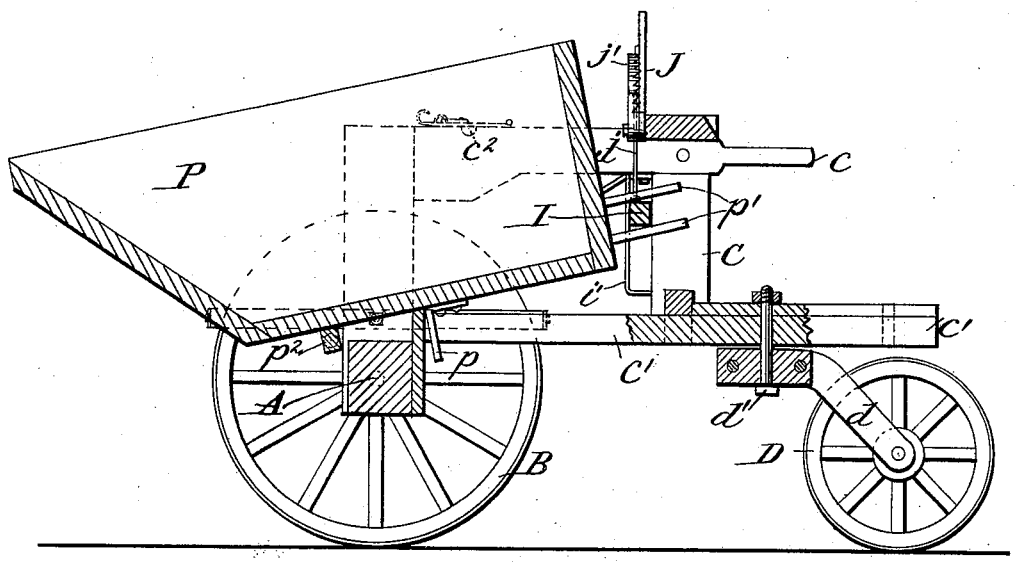
Figure 7:
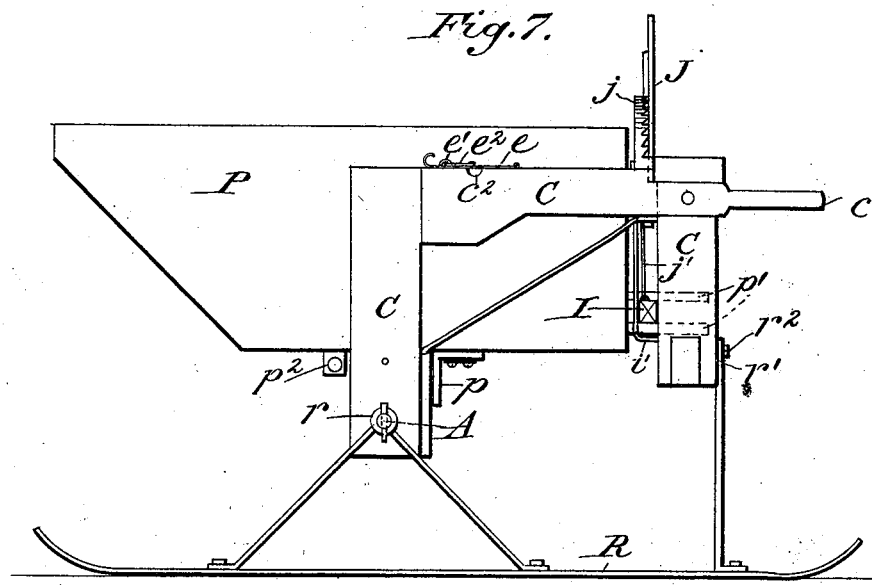

In the drawings, Figure 1 is a side elevation of a device embodying our invention arranged as a reel-carrier; Fig. 2, a plan view of the same; Fig. 3, a longitudinal vertical section of the same; Fig. 4, a section on the line 4 4, Fig. 1; Fig. 5, a section on the line 5 5, Fig. 1; Fig. 6, a longitudinal vertical section of the device arranged as a cart; Fig. 7, a side view of the same on runners.

Referring to Fig. 1 of the drawings, which shows our device arranged for use as a reel-carrier, A is a main axle carried by the rear wheels B. On this axle is supported one end of a framework C, which has forward-projecting handles $c$ for convenience in moving the front end of the machine by hand when desired. To the center of the framework, on the under side, is secured a reach $c'$, which is extended at the forward end and is supported by a guide-wheel D, mounted in a fork $d$, pivoted to the forward end of the reach $c'$ by a king-bolt $d'$, the fork $d$ carrying a scraper $d^2$, whereby the wheel-rim is kept clean from mud, snow, or the like.

The top edges of the two sides of the frame are provided with notches, as shown at $c^2$, Fig. 7, which serve as bearings for a reel-shaft E, the reel-shaft being held in place by hasps $e$, hinged at one end and arranged to engage staples $e'$, the hasps being locked to the staples by hooks $e^2$.

The reel-shaft is arranged to receive a reel F, being provided with a collar $e^3$ at each end of the reel, which collars are removably placed on the reel-shaft, being loose thereupon. The reel F is also removably fixed to the reel-shaft by means of a pin $f$, which passes through the reel and through a hole in the reel-shaft.

At each end of the reel-shaft, outside its bearings, is placed a brake-roller G, each roller having an outward-projecting hub $g$, through which passes a pin-hole. The shaft ends are each provided with a pair of corresponding pin-holes, each hole of each pair being adapted to be brought into register with the pin-hole of its corresponding brake-roller, a pin $g'$ being provided for each brake-roller, by which construction the brake-rollers may each be secured to the reel-shaft in two positions, being in one position close to the framework and in the other position nearly at the outer end of the shaft. The extreme outer ends of said reel-shaft are squared for the reception of cranks H, which have sockets arranged to fit on the said squared ends, the cranks being held against removal by set-screws.

To the sides of the framework above each main wheel are pivoted two brake-levers H', one on each side, each brake-lever having a shoe $h$ at right angles to the lever, which shoes are arranged to swing into contact with the rims of the respective main wheels B B'.

When the rollers G are in their inner positions on the reel-shaft, the brake-levers H' will come into contact with the rims of the respective rollers and will serve as brakes to control the rotation of the reel-shaft and reel. In this condition the brake-shoes $h$ will not come into contact with the rims of their respective main wheels. By moving the brake-rollers G to their outer positions the brake-shoes $h$ can then contact with the said main wheels; but the brake-levers H' will not touch the brake-rollers G. Thus by this arrangement each brake lever and shoe will be capable of two functions—that is, to serve as a brake for either its main wheel or the reel-shaft. Moreover, one brake-roller can be kept in its outer position and the other in its inner position, whereby one brake-lever can be used to brake its main wheel and the other to brake the reel-shaft. In order to permit the operation of these brake devices from the front of the machine, the end of each brake-lever is connected by a rod $i$ to a cross-bar I, which is capable of movement in a vertical direction, being guided by guide-rods $i'$. The cross-bar is arranged to be operated by a bell-crank lever J, which is pivoted to the framework and connected to the cross-bar by a link $j$, a ratchet-segment $j'$ being employed for the purpose of holding the bell-crank lever at any desired position in a well-known manner.

To each side of the framework, inside the main wheels, are pivoted scraper-bars K by means of bolts $k$, passing through the said scraper-bar and through the framework. Each end of each scraper-bar is provided with an outwardly-extending scraper $k'$. Each bar is also provided at equal distances from its pivotal point in each direction with notches $k^2$. Above the pivotal point of each bar is hung a locking-pawl $k^3$, whose end may be swung to either side of the said pivotal point and will enter one or the other of the notches $k^2$ when the scraper-bar is forced down at the corresponding end, whereby the scraper on the depressed end of the said scraper-bar is brought into contact with the rim of its respective wheel, while the scraper at the opposite end of said bar is thrown farther away from the said rim. This result is due to the fact that the pivotal points of the scraper-bars are not concentric with the wheels.

The machine is provided with a seat-post L and seat $l$, the former being removably secured to the machine by means of a foot-piece $l'$, which is held to the upper surface of the forwardly-projecting end of the reach $c'$ by the king-bolt $d'$. The seat-post slopes upward and rearward and rests in a chamfered notch which is formed in the front upper edge of the framework.

In order that the machine may be drawn by horse-power, a draft device is provided, which consists of a draft-bail M, whose inwardly-turned ends are arranged to enter holes in the sides of the framework, the front end of the draft-bail having an eye $m$, into which may be inserted the hook of a whiffletree $m'$, to which whiffletree the draft-animal may be hitched.

Inside the framework and removably secured to the same are two rearwardly-extending roller supports or bars N, to the rear ends of which are secured plates $n$, provided with bearings in which is mounted a horizontal roller $n'$. The said rear ends of the roller-supports N also carry uprights $n^2$, whose upper ends are provided with journals, in each of which is journaled the upper end of a vertical roller $n^3$, whose lower end is stepped in a socket in the respective roller-support.

Beneath the rear end of the machine is placed a tool-box O, which may be provided with a swinging lid or door, as shown.

To convert the reel-carrier thus described into a feed-cart, the rods $i$ are disconnected from the cross-bar I, the brake-levers H' are removed, the reel-shaft and reel are then taken out, and the tool-box O and guide-rollers also removed.

A cart-body P, Figs. 6 and 7, provided with a sloping tail-board, is now placed inside the framework, resting upon the axle. This cart-body is provided with downwardly-extending ears or lugs $p$, which engage the forward side of the axle A, and thereby prevent the cart-body from sliding off the framework in a rearward direction. The forward end of the cart-body is provided with two pairs of forwardly-projecting pins or similar devices $p'$, which are arranged to engage the cross-bar I, which passes between the individual pins $p'$ of each pair. By this construction the bell-crank lever may be used to lift the front end of the cart-body, whereby the latter may be inclined at any desired angle to permit the said cart-body to be readily unloaded.

We also provide a pair of sleigh-runners R for our device, these runners each having a thimble $r$, which is intended to slip onto the thimble-skein of the axle A, the main wheels of course being removed first. The front ends of the runners R have rear standards with inwardly-projecting ends $r'$, arranged to be removably secured to the front end of the framework in any suitable manner, as by bolts $r^2$. When the runners are to be used, the reach $c'$ is also removed, together with the seat and seat-post. When, however, wheels are used under the cart-body, the guide-wheel D is preferably moved back along the reach $c'$, as shown in Fig. 6, another hole being provided in the reach, through which the king-bolt $d'$ may be passed.

As under some circumstances it is convenient to have the feed-cart in use at the same time the reel-carrier is being used, we therefore supply the cart-body P with a supplementary axle $p^2$, on which may be placed a set of wheels, a spare set being necessary for this purpose, the pins $p'$ at the front of the cart-body then serving as handles for pushing the feed-cart about.

Having thus fully described our invention, what we claim as new, and desire to secure by Letters Patent, is—

1. In a reel-carrier, the combination with the main wheels, a reel-shaft, and a brake-roller secured thereto and adjustable in and out on the same, of a brake-lever, arranged to engage the brake-roller in one position of the same, and provided with a shoe arranged to engage one of the main wheels in the other position of the brake-roller, substantially as described.

2. In a reel-carrier, the combination with the main wheels, a reel-shaft having two pin-holes at its end, a brake-roller mounted on said end and having a pin-hole arranged to be brought into register with either pin-hole in the shaft, and a pin insertible in the registering pin-holes, of a brake-lever arranged to engage the brake-roller in one position of the latter, and provided with a shoe for engagement with one of the main wheels when the brake-roller is in its other position.

3. In a reel-carrier, the combination, with a main wheel of a scraper-bar pivoted eccentrically to the axis of the main wheel, a scraper at each end of the scraper-bar, each scraper being arranged to be brought into engagement with the wheel-rim when the scraper-bar is tipped in one direction on its pivot, and means for locking said scraper-bar in such tipped position.

4. In a reel-carrier, the combination with a main wheel of a scraper-bar pivoted eccentrically to the axis of the main wheel and provided with notches equidistant from the pivotal point and on each side of the same, a scraper at each end of the scraper-bar and arranged to respectively contact with the wheel-rim, when the scraper-bar is tipped, and a locking-pawl pivoted above the scraper-bar and arranged to be brought into engagement with either notch in the said bar, whereby the same is locked when tipped in either direction.

5. In a combined reel-carrier and feed-cart, the combination, with a framework arranged to receive both a reel and a cart-body interchangeable with the reel, and wheels on which said framework is mounted, of a removable brake mechanism arranged to brake the wheels and the reel, a cross-bar arranged to engage both the brake mechanism and the cart-body, and means for operating the cross-bar, whereby the said means serves either to apply the brake mechanism or to tilt the cart-body, substantially as described.

In testimony whereof we affix our signatures in presence of two witnesses.

MARTIN HELGESON.
OLAUS HELGESON.

Witnesses:
W. H. COB,
R. K. RASMUSSON.